(12) United States Patent
Rodriguez

(10) Patent No.: US 9,493,915 B2
(45) Date of Patent: Nov. 15, 2016

(54) TREE WELL AND RELATED METHODS

(71) Applicant: Christian Rodriguez, Coronado, CA (US)

(72) Inventor: Christian Rodriguez, Coronado, CA (US)

( * ) Notice: Subject to any disclaimer, the term of this patent is extended or adjusted under 35 U.S.C. 154(b) by 315 days.

(21) Appl. No.: 14/194,517

(22) Filed: Feb. 28, 2014

(65) Prior Publication Data

US 2015/0247292 A1   Sep. 3, 2015

(51) Int. Cl.
*E01C 9/00* (2006.01)
*A01G 13/00* (2006.01)

(52) U.S. Cl.
CPC ........... *E01C 9/005* (2013.01); *A01G 13/0281* (2013.01)

(58) Field of Classification Search
CPC .... E01C 9/004; E01C 9/005; A01G 13/0281
USPC ............. 264/34; 47/31, 31.1, 32, 32.3, 32.7, 47/32.8
See application file for complete search history.

(56) References Cited

U.S. PATENT DOCUMENTS

| | | | | |
|---|---|---|---|---|
| 3,439,450 A | * | 4/1969 | Richards | A01G 13/0268 106/672 |
| 3,738,070 A | * | 6/1973 | Yarbrough | E04H 13/00 52/130 |
| 4,308,688 A | * | 1/1982 | Revane | E01C 9/005 47/32 |
| 5,006,013 A | * | 4/1991 | Burkstaller | E01C 13/02 405/265 |
| 5,442,891 A | * | 8/1995 | Albrecht | E02D 31/00 47/32.7 |
| 6,517,915 B1 | * | 2/2003 | Banus | B44F 1/14 156/61 |
| 2004/0200140 A1 | * | 10/2004 | Alexander | A01G 13/0281 47/32 |
| 2007/0009665 A1 | * | 1/2007 | Alexander | E01C 9/005 427/385.5 |
| 2013/0074254 A1 | * | 3/2013 | Payne | E04H 4/0006 4/491 |
| 2013/0139433 A1 | * | 6/2013 | Pontarolo | A01G 13/00 47/32.6 |

FOREIGN PATENT DOCUMENTS

| | | | | |
|---|---|---|---|---|
| EP | 0189003 A2 | * | 7/1986 | ............... E01C 7/30 |
| GB | 2202722 A | * | 10/1988 | ............... A01G 9/00 |

* cited by examiner

*Primary Examiner* — Timothy Kennedy
(74) *Attorney, Agent, or Firm* — Buche & Associates, P.C.; John K. Buche; Bryce A. Johnson

(57) ABSTRACT

The present invention relates integrating trees into urban environments. It is a method for creating a tree well that is permeable, supports tree growth, safe for pedestrians, and aesthetically pleasing. The invention solves many of the problems associated with urban trees such as drainage problems, odor problems, and trip hazards.

8 Claims, 6 Drawing Sheets

TREE WELL AND RELATED METHODS

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF INVENTION

1. Field of the Invention

The disclosed subject matter is in the field of urban landscaping, particularly tree wells and tree grates.

2. Background of the Invention

Urban landscape design often includes trees. Trees are typically planted near urban sidewalks. Well-placed trees are a pleasant contrast to large urban skyscrapers and congested streets. Trees are aesthetically pleasing and give people in urban environments a bit of nature. While trees are desirable in an urban environment, integrating trees into an urban setting has many challenges.

One challenge to planting trees in an urban environment is maintaining the health of the trees. A tree in an urban environment faces many hazards not seen in the natural environment, such as pollution, people who may damage trees, bicycles chained around a tree, and dogs that treat urban trees like a restroom. In addition, the soil in an urban environment can lack the nutrients a tree needs and sometimes it can be challenging for an urban tree to get water.

There are three main ways that landscapers and urban planners have attempted to integrate trees into urban environments, tree boxes, tree grates, and paving around the trees. While each of these methods allow for the integration of trees into an urban environment, each method has major drawbacks.

One method of integrating a tree into an urban environment is to place the tree inside of a tree box. The tree is planted inside of a small boxed area and soil surrounds the tree instead of concrete. However, in an urban setting people will step on the soil, compacting it. When the soil is compacted, the tree will not be able to get enough air and water and compacted soil can cause storm water problems. The roots of a tree store water, meaning that puddles will collect around the tree on rainy day. Tree boxes can also attract weeds. If weeds are growing in a tree box, that means that a landscapers must constantly maintain the tree box or else the health of a tree may be compromised.

Surrounding an urban tree with a tree grate will solve many of the problems associated with a tree box. A tree grate is typically metal and has openings that allow water and nutrients to get to the tree. A tree grate can feature an interesting aesthetic design. Tree grates will solve the drainage and weed problems created from a tree box, but present new issues. Trash can get stuck underneath the grate potentially attracting rodents. Grates can become odorous in areas where there are many dog owners. Often times, a grate cannot withstand the tree growth and will buckle. If the grate is constructed of a strong, sturdy material, there is a chance that the grate may stunt the growth of a tree or damage the tree. Grates are not one size fits all, and problems can arise when a tree is too small for a grate. If the opening is too big then, adding a tree grate does not solve the problems associated with a tree well, such as weeds and drainage issues. Furthermore, because tree grates contain openings to allow for water to get to the tree, it must comply with the Americans with Disabilities Act (ADA). The openings of tree grates can cause hazards for people using a cane or a walker, and in some cities the ADA has raised objections to the use of any tree grate, even ones complying with the ADA.

The least popular method for integrating trees into an urban environment is paving over the tree. Paving over the tree causes the tree roots to push up. When the tree roots push up through the ground, it can cause the pavement to buckle making it uneven. The uneven pavement can create a dangerous condition, especially to people with disabilities.

There have been some attempts at integrating trees into an urban environment. U.S. Pat. No. 3,571,972 to Carter discloses a collar that fits around a tree. The collar is round and contains slits and will prevent weeds from growing near the tree. WO 2006099851 to Baumscheibe discloses a tree grate. The tree grate is flush with the ground and made from a material consisting of mineral aggregates and organic adhesives. While these inventions are useful to integrating a tree into an urban environment, they do not solve the problems associated with tree grates, such as trash and rodents.

Some of the attempts to integrate trees into an urban environment involve the development of a flexible concrete that be poured over the tree that a lows for water to reach the tree roots, but not buckle due to tree roots. U.S. Pat. No. 3,891,585 to McDonald discloses an elastic pavement repair composition. The composition disclosed in McDonald is not specifically tailored for use with trees. U.S. Pat. App. 2011/0064517 to Sader, and all disclose a pervious concrete and lists tree wells as one of many possible uses for the concrete. U.S. Pat. App. 2004/0200140 to Alexander describes a tree skirt made of a flexible rubberized material. Alexander's invention can be adapted for use with tree grates or the skirt can be used without a tree grate. While Alexander's invention solves some of the problems involved with tree wells, it does not solve all of them, such as odors emerging from tree wells.

SUMMARY OF THE INVENTION

It is an object of the present invention to improve irrigation surrounding trees.

It is another object of the present application to remove urban barriers from trees.

It is another object of the present invention to create an aesthetically pleasing landscape around urban trees.

It is another object of the present invention to create a cleaner and safer environment surrounding urban trees.

It is another object of the present invention to reduce odor and trash problems associated with traditional tree grates.

It is another object of the present invention to minimize the damage to sidewalks caused by tree roots.

It is another object of the present invention to save water and eliminate drainage problems caused by tree wells.

It is yet another object of the present invention to reduce the amount of maintenance required for trees in city settings.

It is another object of the present invention to integrate trees into an urban environment that is safer for individuals with disabilities and reduce the risk of tripping and falling associated with traditional tree grates.

BRIEF DESCRIPTION OF THE FIGURES

The manner in which these objectives and other desirable characteristics can be obtained is explained in the following description and attached figures in which.

DETAILED DESCRIPTION OF THE INVENTION

Disclosed is a method for creating a tree well comprising: creating a perimeter around the tree; spreading gravel in the tree well to outside of the barrier; mixing an epoxy aggregate and crushed stone via a mixer; pouring the mixture into the well while still wet, so the epoxy aggregate is compacted, substantially flush with the sidewalk, and finished with a trowel; mixing rubber buffings with an aromatic binder in a mixer; pouring the mixture into the perimeter next to the tree to about the same level as the gravel layer and marble; mixing ethylene propylene diene monomer (EPDM) with an aromatic binder in a mortar mixture and pouring it on top of the rubber buffings; and, letting the mixture dry.

Figure 1:
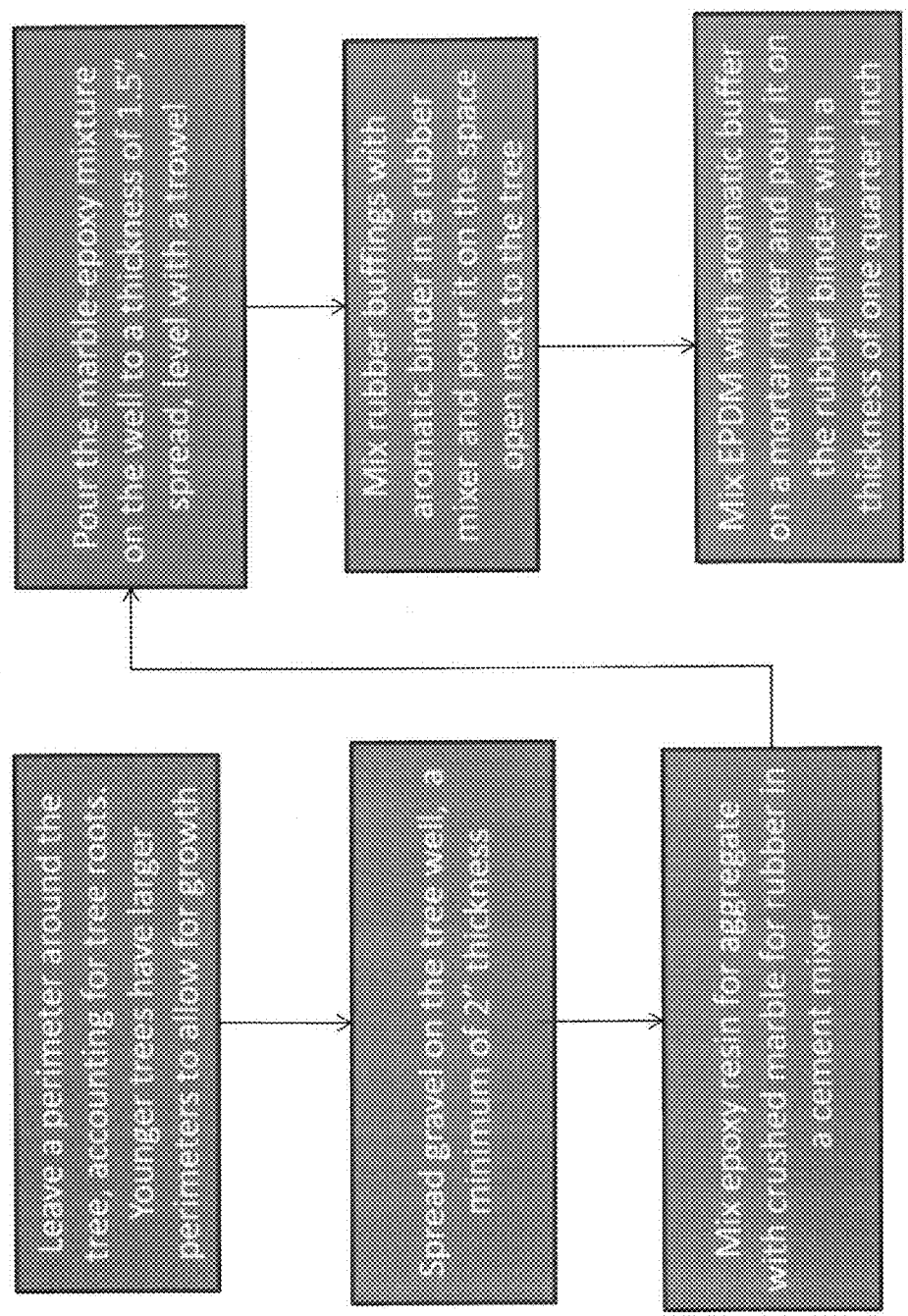
FIG. 1 is a flow chart describing the process of creating a tree well.

FIG. 1 describes the process for creating a tree well. In one embodiment for pedestrian areas, the system requires three quarter inch gravel, one quarter inch crushed marble, epoxy resin for aggregate, rubber buffings, ethylene propylene diene monomer (EPDM), preferably one to four millimeter colored granule, and an aromatic binder for rubber. This system is installed by: (1) leaving a circle around the tree to be filled. If the roots are exposed, then the circle follows the roots. If the tree is young, the circle is large to accommodate root growth; (2) spreading gravel outside of the circle, but inside of the tree well to a minimum of two inches thick, but suitably the thickness will range from three to four inches; (3) mixing the aggregate, the crushed marble, and the binder via a cement mixer and, while still wet, pouring the mixture into the well to a thickness of one and one half inch thick so the aggregate is compacted, flushed with the sidewalk, and finished with a trowel; (4) mixing the rubber buffings with the binder in a mortar mixer before pouring the mixture into the circle next to the tree to the same level as the gravel and aggregate; and (5) mixing the EPDM with the binder on the mortar mixture and pouring it on top of the rubber buffings, preferably to a thickness of one quarter inch; and (6) letting the mixture dry. Once the mixture has dried, the surface will be permeable to water flow and can support the weight of pedestrians.

In some embodiments, there is a peat moss medium that is placed under the layer of crushed marble. Toe peat moss medium contains Urea "Z" which is made by Green Clean Green Products, or the equivalent. Urea "Z" is a microbe based product that breaks down urea, the compound that causes odors in urine, by converting it to water and carbon dioxide and is environmentally safe.

Figure 2:
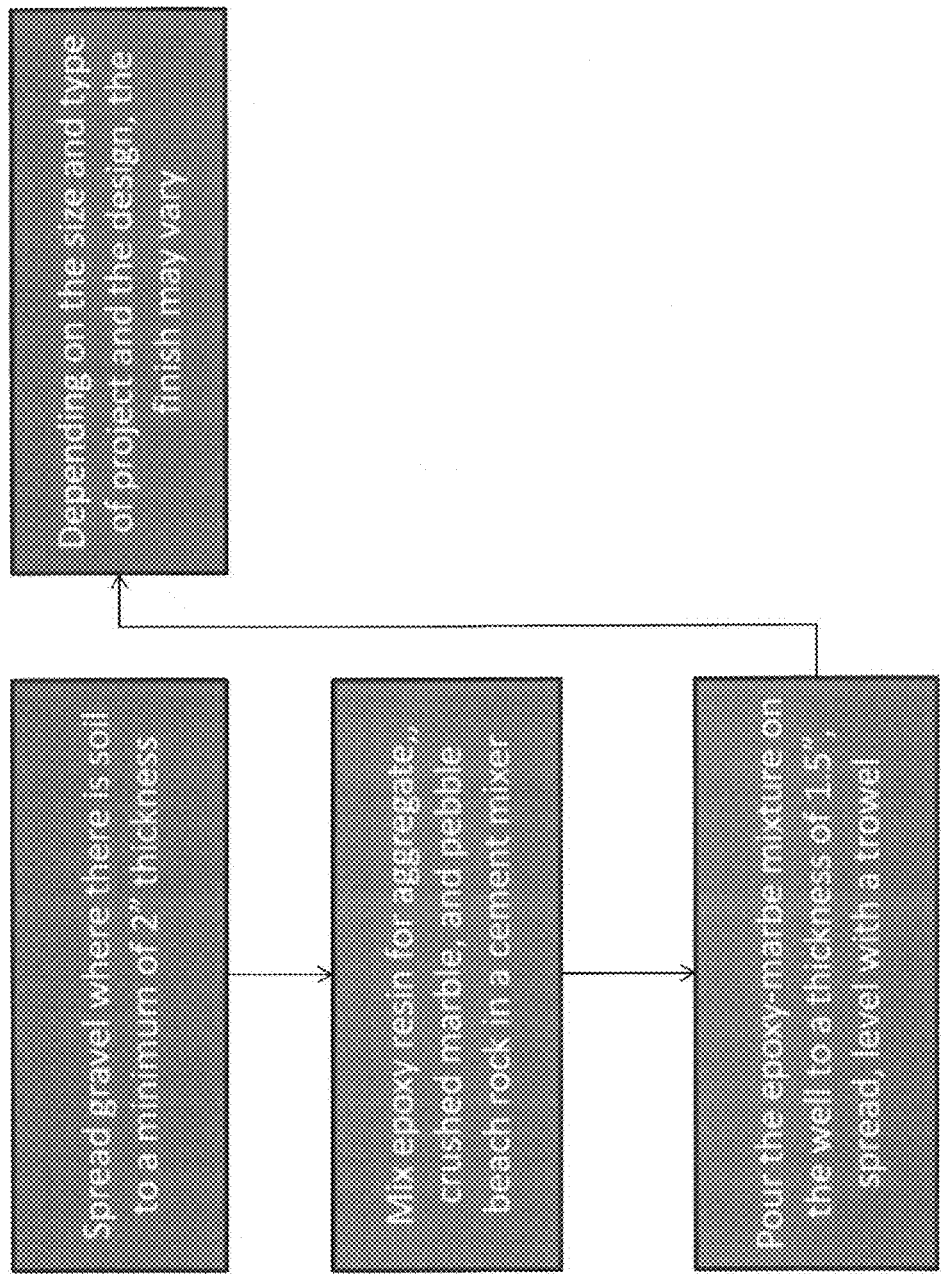
FIG. 2 is a flow chart describing the process of creating a decorative tree well.

FIG. 2 shows the process for decorative areas. For decorative areas, the system requires gravel for landscape or soil areas, crushed marble, pebble beach rock (a larger diameter size is recommended for design rather than foot traffic other than maintenance), and epoxy resin for aggregate. Installation is substantially as described above, but depending on the project or job design, the size of the aggregate and the finish will vary.

Figure 3:
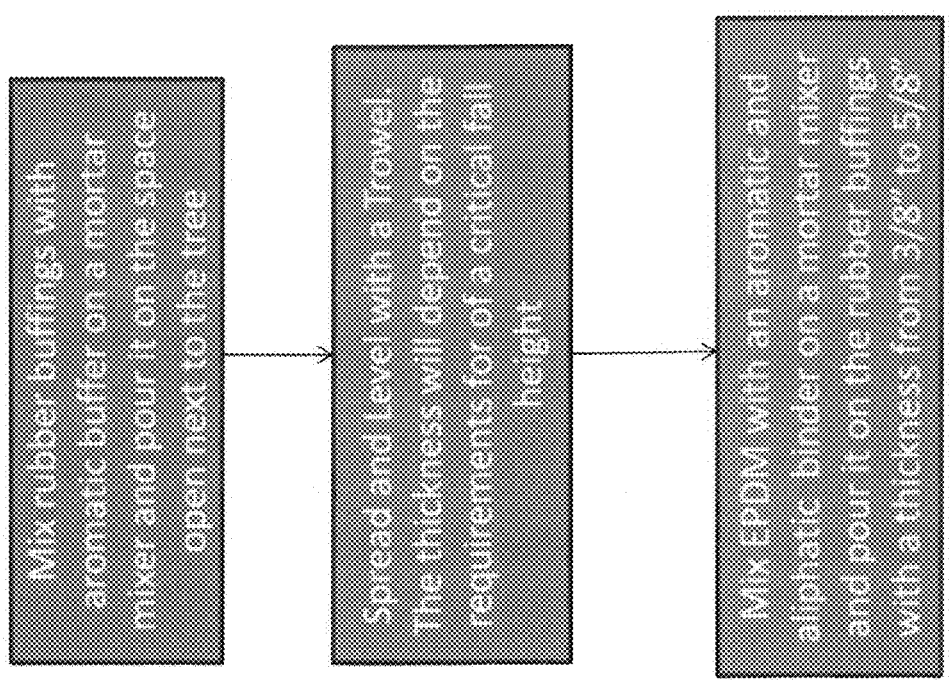
FIG. 3 is a flow chart describing the process of creating a safety surface.

FIG. 3 shows the process for creating a safety surface. For safety areas, the system requires a compacted base, rubber buffing's, EPDM one to four millimeter colored granule, and an aromatic & aliphatic binder for rubber. Installation of the safety surface is achieved by: (a) mixing the rubber buffings and binder and pouring the same into the install area with a thickness of one and one quarter inches to five inches, (b) mixing the EPDM with the binder and pouring the same onto the rubber buffings with a thickness from three eights of an inch to five eights of an inch. In any embodiment, a tree grate can be used in conjunction with the system, wherein the materials are poured into the openings of the grate so that the grate and substances are level although other levels may be used.

Figure 4:
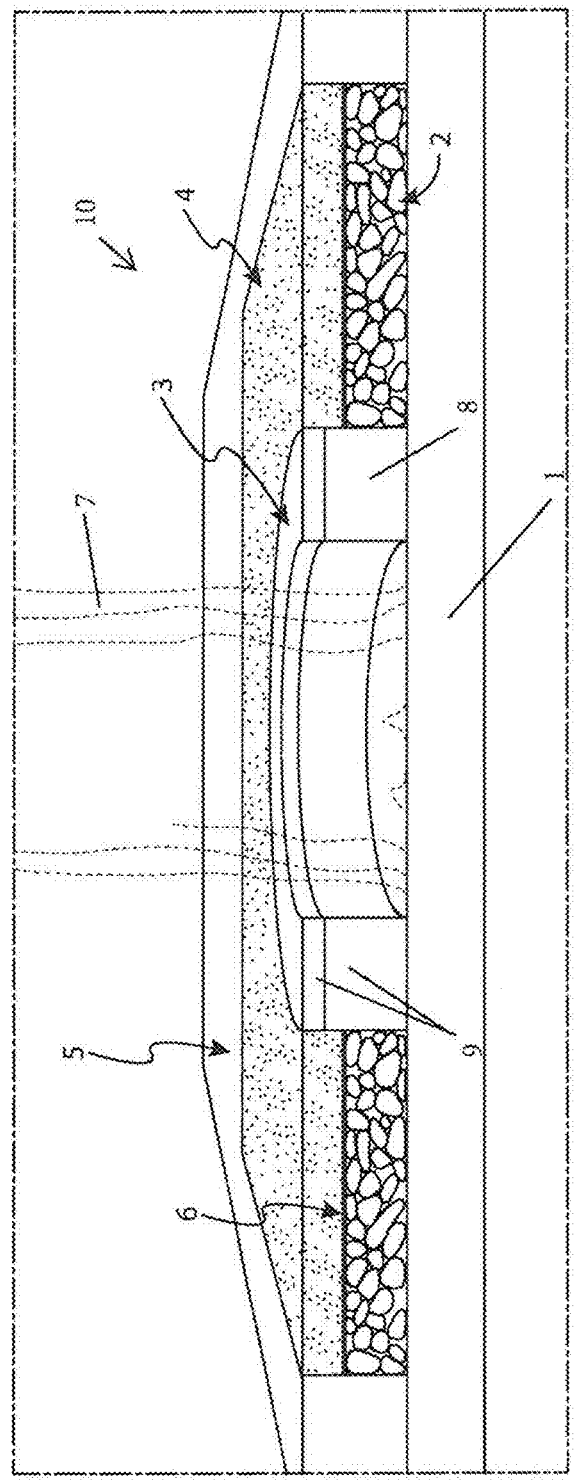
FIG. 4 is a cross sectional view of a tree well.

FIG. 4 depicts a cross-sectional view of a tree well 10 created by the process described in FIG. 1. The figure shows a tree 7 growing in an urban environment. The tree well 16 is surrounded by a concrete sidewalk 5. The bottom layer is the natural soil 1. The next layer is a gravel layer 2. The gravel layer 2 is preferably constructed from three quarter inch gravel. The vertical height of the gravel layer 2 depends on the needs of the tree well. The minimum vertical height of the gravel layer 2 is two inches level although other levels may be used. The preferable vertical height of the gravel layer 2 is between three and four inches.

In the embodiment shown, immediately above the gravel layer 2 is a peat moss layer 6. The peat moss layer 6 contains Urea "Z" or an equivalent product that can break down urea, which is the odor causing compound in urine.

Immediately above the peat moss layer 6 is a layer of crushed marble 4. The crushed marble layer 4 is made by mixing crushed marble and epoxy resin. The marble layer 4 preferably is mixed in a cement mixer and poured over the peat moss layer 6. The preferably vertical height of the marble layer 4 is one and one half inches. Once the marble-epoxy-aggregate mixture has been spread over the peat moss layer 6 the marble layer 4 should be leveled so that it is even with the concrete sidewalk 5. The marble layer 4 can be black, ivory, grey, beige, brick, rose coral, salmon or another color depending on the aesthetic needs of the community. The marble layer 4 and the gravel layer 2 are permeable so that water and other nutrients can reach the soil 1 and the roots of the tree 7.

The area immediately surrounding the tree 7 is encircled by a trunk collar 9. The trunk collar 9 is made up of two layers: the trunk collar base 8 and trunk collar top layer 3. The trunk collar base 8 is constructed out of rubber buffings or crushed rubber tires. The rubber buffings should be clean and free of any pollutants. In order to make the trunk collar base 8, the rubber buffings are mixed with an aromatic binder for rubber. Suitably, the trunk collar base 8 is between five and six, inches vertically. The circumference of the trunk collar base 8 will vary depending on the type of tree 7. For a younger tree 7, the trunk collar base 8 will have a larger circumference around the tree 7 in order for the tree 7 to grow. The trunk collar base 8 will have a smaller circumference for an older tree 7. Directly on top of the trunk collar base 8, is a trunk collar top layer 3. The trunk collar top layer 3 is constructed from a mixture of EPDM and an aromatic binder. The binder and EPDM are mixed on a mortar mixer and poured over top the tree collar base 8 preferably to a vertical height of one quarter inch. Both layers of the tree collar 9 are flexible and permeable, so that the tree 7 can get the nutrients it needs and grow. The tree collar will not harm the trunk of the tree 7.

Figure 5:
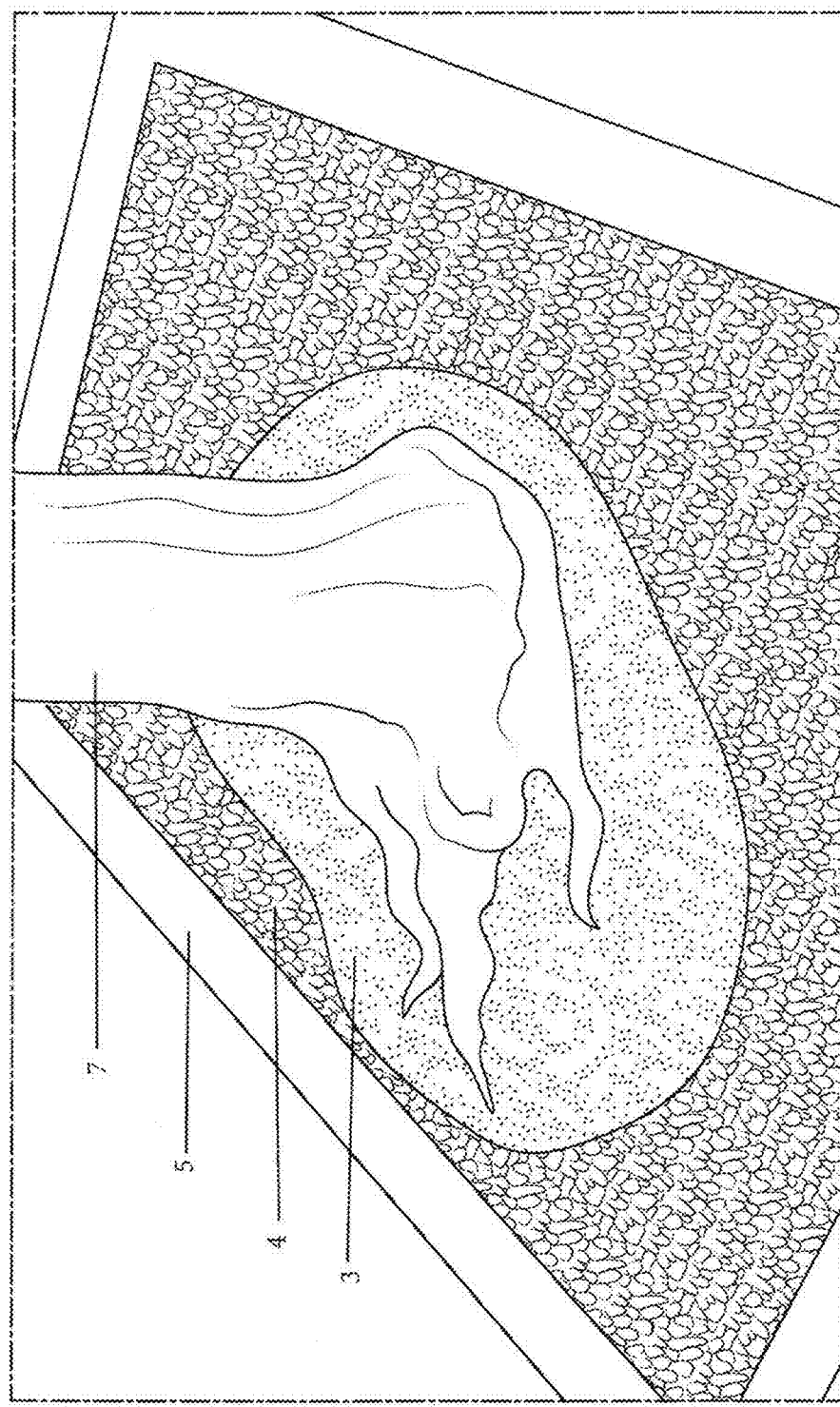
FIG. 5 is a perspective view of a tree in the tree well.

FIG. 5 shows a perspective view of the tree well 10 as seen by a pedestrian. The tree 7, the tree collar top layer 3, and the marble layer 4 are the only layers that are visible. This drawing shows one of the benefits of the tree well 10, that the tree well is level with the sidewalk, making the tree area safe to walk on and free from trip hazards.

Figure 6:
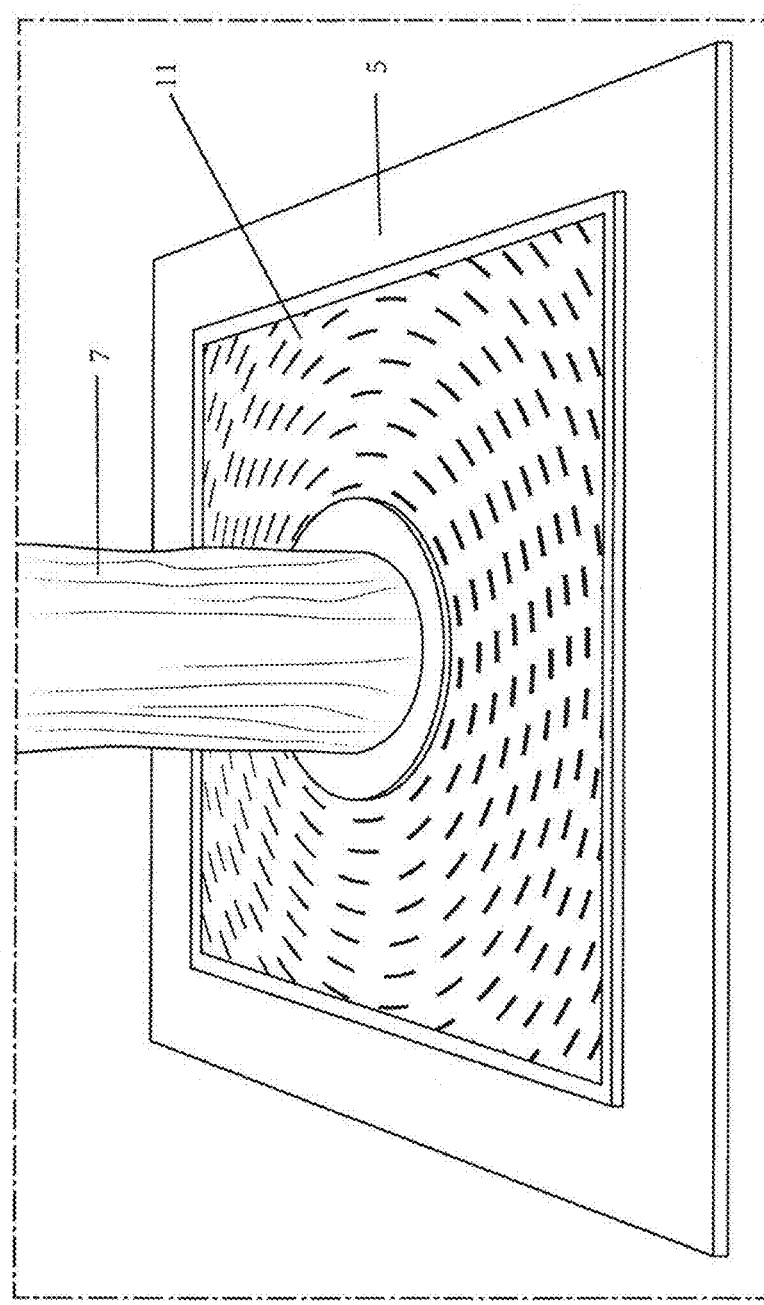
FIG. 6 shows an alternate embodiment of the tree well where the tree well is used in conjunction with an existing tree grate.

FIG. 6 shows an alternate embodiment of a tree well 10. In this drawing a tree is surrounded by a tree well 10 constructed using the same process as described in FIG. 1, but this embodiment incorporates an existing tree grate 11. Using this process with an existing tree grate 11 may be ideal in some instances because a city or community has already invested money into tree grates 11, and in some instances tree grates 11 have been selected for aesthetic purposes. The advantage to combining the tree well process described in FIG. 1 with a tree grate 11 is that the tree well process will make the area in and around the openings of a grate 11 level, reducing trip and fall hazards. The exterior layers of the tree well 10 come all the way to the top of the grate and will leave no openings in the grate as well as no opening in the center of the tree well 10. The tree well process will also mitigate trash and rodent problems associated with tree grates. Because the tree well 10 is level, the tree well 10 will comply with the ADA and there will not be a trip hazard.

It is to be noted that appended drawings illustrate only typical embodiments of this invention, are not to scale and therefore not to be considered limiting of its scope, for the invention may admit to other equally effective embodiments which are appreciated by those skilled in the arts.

All features disclosed in this specification, including any accompanying claims, abstract, and drawing, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step of" in the clause as specified in 35 U.S.C. §112, paragraph 6 may not be intended as a means plus claim.

The invention claimed is:

1. A method for filling a tree well comprising:
    locating a tree in the tree well, where the tree well is defined by a bottom layer of soil and at least one side wall that is a concrete sidewalk;
    creating a perimeter around a trunk of the tree and within the tree well;
    forming a gravel layer by spreading gravel in the tree well and over the soil in between the side wall and the perimeter so that the gravel layer is (a) positioned over the bottom layer of soil, (b) abutted to the side wall, and (c) features a side wall along the perimeter;
    mixing an epoxy aggregate and crushed stone into a first mixture via a cement mixer;
    forming a crushed stone layer by pouring the first mixture into the well while the first mixture is still wet, where said crushed stone layer is positioned over the top of said gravel in between the side wall and the perimeter so that the crushed stone layer is (a) positioned over the gravel layer (b) abutted to the sidewalk, and features a side wall along the perimeter;
    compacting the crushed stone layer so that a top surface of the crushed stone layer is substantially flush with a top surface of the sidewalk
    finishing the top surface of the crushed stone layer with a trowel;
    mixing rubber buffings with an aromatic binder to form a second mixture in a mortar mixer;
    creating a base of a trunk collar by pouring the second mixture into the perimeter next to the trunk of the tree over the soil and within the side walls of the gravel and crushed stone layers to about the same level as the the top surface of the crushed stone layer;
    mixing ethylene propylene diene monomer (EPDM) with an aromatic binder to form a third mixture in the mortar mixer;
    creating a top layer of the trunk collar by pouring the third mixture on top of the base of the trunk collar; and, letting the first, second, and third mixtures dry.

2. A method for filling a tree well according to claim 1 wherein there is a peat moss medium placed under the crushed stone layer containing a microbe-based compound that breaks down urea.

3. A method for filling a tree well according to claim 1 further comprising the step of placing a tree well over the crushed stone layer.

4. A method of filling a tree well according to claim 1 where the crushed stone layer is about 1.5 inches thick.

5. A method of filling a tree well according to claim 4 where the top layer of the trunk collar is about one quarter inch thick.

6. A method of filling a tree well according to claim 5 where the base of the trunk collar is in a range of 5 and 6 inches thick.

7. A method of filling a tree well according to claim 6 where the gravel layer is in a range of 3 and 4 inches thick.

8. A method for creating a decorative area comprising:
    spreading gravel where there is soil to a minimum of two inches thickness;
    mixing an epoxy resin for aggregate, crushed marble, and pebble beach rock via a cement mixer; and,
    pouring the mixture of epoxy resin for aggregate, crushed marble, and pebble beach rock over the gravel to a thickness of one and a half inches.

* * * * *